United States Patent
Porter

(10) Patent No.: US 6,555,039 B1
(45) Date of Patent: Apr. 29, 2003

(54) METHOD FOR INJECTION BLOW MOLDING AN AUTOMOTIVE COMPONENT

(76) Inventor: Marshall Ray Porter, 12030 Perry County Line Rd., Oakdale, IL (US) 62268

( * ) Notice: Subject to any disclaimer, the term of this patent is extended or adjusted under 35 U.S.C. 154(b) by 0 days.

(21) Appl. No.: 09/673,095

(22) PCT Filed: Apr. 21, 1999

(86) PCT No.: PCT/US99/08688
§ 371 (c)(1),
(2), (4) Date: Oct. 11, 2000

(87) PCT Pub. No.: WO99/54113
PCT Pub. Date: Oct. 28, 1999

Related U.S. Application Data

(60) Provisional application No. 60/082,617, filed on Apr. 22, 1998.

(51) Int. Cl.[7] ................................................. B29C 49/30
(52) U.S. Cl. ........................ 264/85; 264/537; 264/328.7; 425/533
(58) Field of Search ........................ 293/120, 110, 293/107, 122; 264/85, 537, 328.7; 425/533

(56) References Cited

U.S. PATENT DOCUMENTS

| | | | |
|---|---|---|---|
| 2,706,308 A | * 4/1955 | Lorenz | 264/539 |
| 3,029,468 A | 4/1962 | Valyi | |
| 3,337,910 A | 8/1967 | West | |
| 3,809,517 A | 5/1974 | Schneider | |
| H671 H | 9/1989 | Cho et al. | |
| 5,271,650 A | 12/1993 | Fukuhara et al. | |
| 5,849,377 A | * 12/1998 | Horikoshi et al. | 428/35.7 |
| 6,197,245 B1 | * 3/2001 | Usui et al. | 264/572 |

* cited by examiner

*Primary Examiner*—Suzanne E. McDowell
(74) *Attorney, Agent, or Firm*—Banner & Witcoff, Ltd.

(57) ABSTRACT

A method and mold (10) for manufacturing a vehicle component such as a bumper beam (52) or body panel (62). The component is manufactured by: 1) injecting molten material into a parison cavity of a mold (10) to form a parison (40), wherein the mold has at least two sections (14, 18) that are moveable between a first position defining the parison cavity and an expanded second position defining predetermined blow cavities; 2) retracting the at least two sections (14, 18) to the expanded second position, and 3) injecting a gas into the parison (40) to expand the parison (40) to form blown part (44).

16 Claims, 3 Drawing Sheets

METHOD FOR INJECTION BLOW MOLDING AN AUTOMOTIVE COMPONENT

The present application claims priority under 35 U.S.C. Section 119 under the pending United States Provisional Patent Application Ser. No. 60/082,617, Method and Apparatus for Injection Blow Molding an Automotive Component, inventor Marshall Ray Porter, assigned to Conix Corporation, and filed on Apr. 22, 1998.

FIELD OF THE INVENTION

This invention relates to a method and apparatus for manufacturing an automotive component such as a bumper beam and body panel. In particular, this invention relates to a method and apparatus for manufacturing a relatively large one piece automotive component at a single station.

BACKGROUND OF THE INVENTION

Many automotive components can be manufactured using conventional injection blow molding or extrusion blow molding machines. However, certain body panels and bumper beams are generally too large for a single injection mold or a blow mold to accommodate. Thus, such larger parts are required to be transferred from the injection station to the blow station. This transfer increases the amount of time required to manufacture a part, increases the risk of damage and reduces the efficiency of production.

SUMMARY OF THE INVENTION

The disadvantages of the prior art may be overcome by providing a method and apparatus for manufacturing an automotive component such as a bumper beam and body panel at a single station.

It is desirable to provide a method and apparatus for manufacturing a one piece decorative component which is structurally self-supporting.

It is desirable to provide a method and apparatus for manufacturing a one piece component, which apparatus can be retrofitted onto existing injection molding machines.

It is desirable to provide a method and apparatus for manufacturing a one piece component having visually smooth or class A surfaces.

According to one aspect of the invention, there is provided a mold having sections which are movable between a parison molding position and an expanded position. At the first stage, the sections cooperate to present a parison cavity for forming a parison. Molten material is injected into the parison cavity. The sections then retract to an expanded position. The parison is then blown forcing the material to expand to conform to the cavity in the expanded condition. Once the part is sufficiently solidified, the mold is opened and then the part is ejected.

DESCRIPTION OF THE DRAWINGS

In drawings which illustrate an embodiment of the invention.

DESCRIPTION OF THE INVENTION

Figure 1:
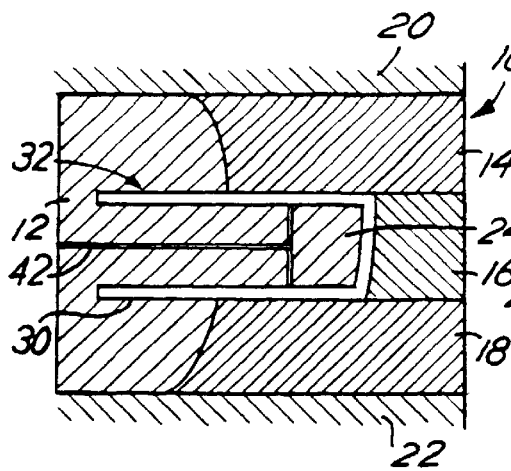
FIG. 1 is a sectional view of a mold embodying the present invention, the mold in a parison forming condition.

The mold apparatus 10 is schematically illustrated in FIG. 1. The mold 10 comprises a base 12, moveable sections 14, 16 and 18 and side walls 20 and 22. The movable sections are typical injection mold sections which are constructed to be heated to about 85 degrees C.

Base 12 has an anvil 24 which extends beyond molding surfaces 26 and 28. Extending into the base 12 from anvil 24 are two slots 30 and 32. Slots 30 and 32 join about the ends of anvil 24 to extend about the circumference of the base of the anvil 24.

Figure 2:
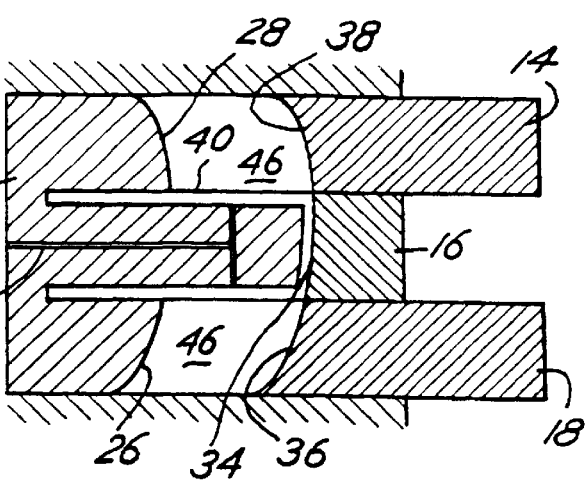
FIG. 2 is sectional view of the mold of FIG. 1, the mold in an expanded condition.
Figure 3:
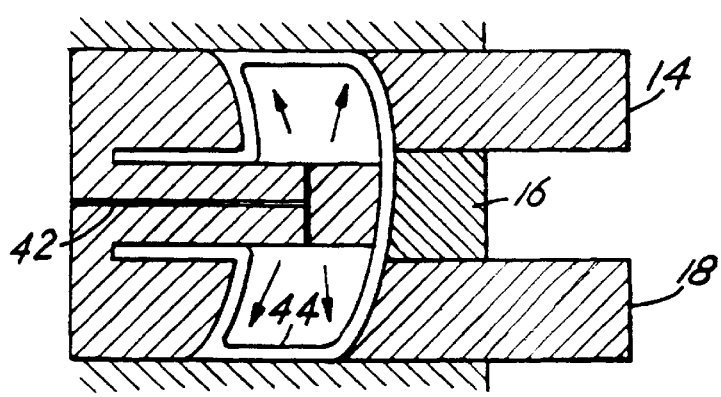
FIG. 3 is a sectional view of mold of FIG. 1 undergoing a blowing process.
Figure 4:
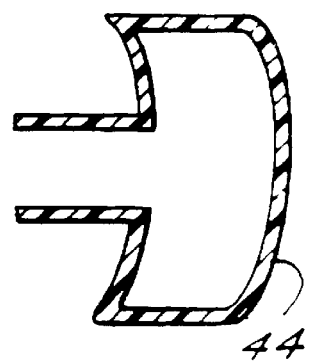
FIG. 4 is a sectional view of a finished part manufactured in accordance with the present invention.

Moveable sections 14 and 18 have respective end surfaces 36 and 38 which are shaped to be complementary with molding surfaces 26 and 28, respectively. Sections 14 and 18 are constructed and arranged to slide relative to base 12 and along side walls 20 and 22, respectively between a parison forming condition (FIG. 1) and an expanded condition (FIG. 2). Sections 14 and 18 are spaced on opposite sides of anvil 24.

Section 16 has an end surface 34 which is shaped to be complementary to the distal end of anvil 24. Section 16 is spaced from the distal end of anvil 24.

When the sections 14, 16 and 18 are closed relative to the base 12 in the parison forming condition, slots 30 and 32 and the space between anvil 24 and the sections 14, 16 and 18 define a parison cavity. When sections 14 and 18 are retracted such that end surfaces 34, 36 and 38 form a continuous surface, the parison cavity is expanded defining blow cavities 46 on opposite sides of anvil 24. Blow cavities 46 are defined by molding surfaces 26 and 28, side walls 20 and 22 and end surfaces 34, 36 and 38.

At the first stage of manufacture, the sections 14, 16 and 18 cooperate to present a parison cavity for forming a parison 40. Molten plastic material is injected into the parison cavity in a conventional manner well known in the art. The sections 14 and 18 then retract to an expanded position, presenting blow cavities 46. A pressurized gas, such as air or nitrogen, is then injected through passageway 42 in anvil 24. The parison 40 is then blown outwardly forcing the parison 40 to expand to conform to the cavity in the expanded condition. Once the blown part 44 is sufficiently solidified, the mold 10 is opened and then the part 44 is ejected.

Figure 5:
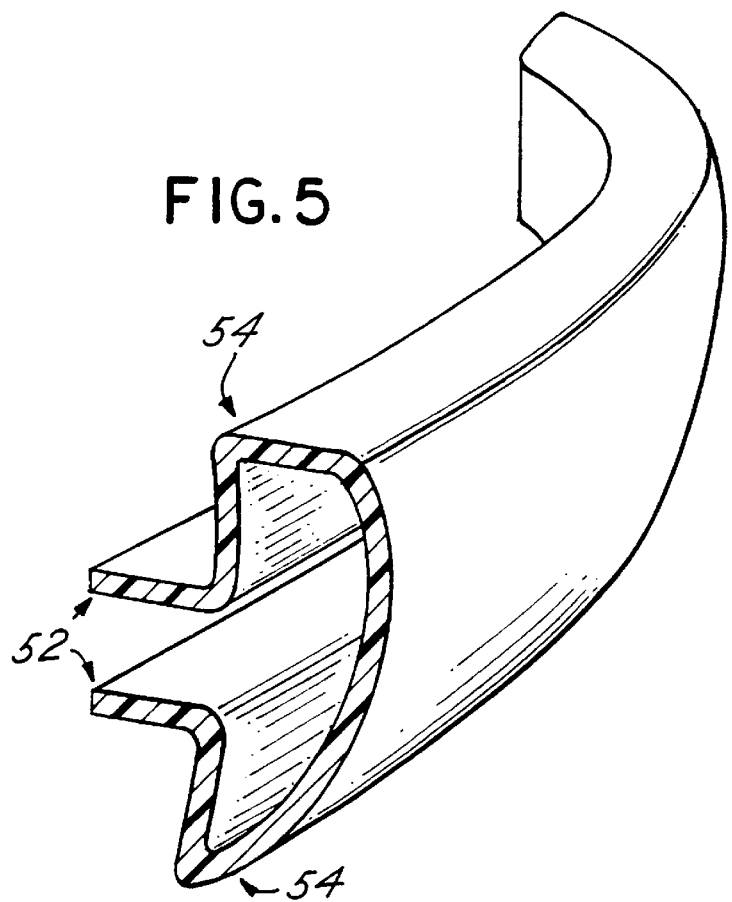
FIG. 5 is a sectional view of a bumper beam manufactured in accordance with the present invention.
Figure 6:
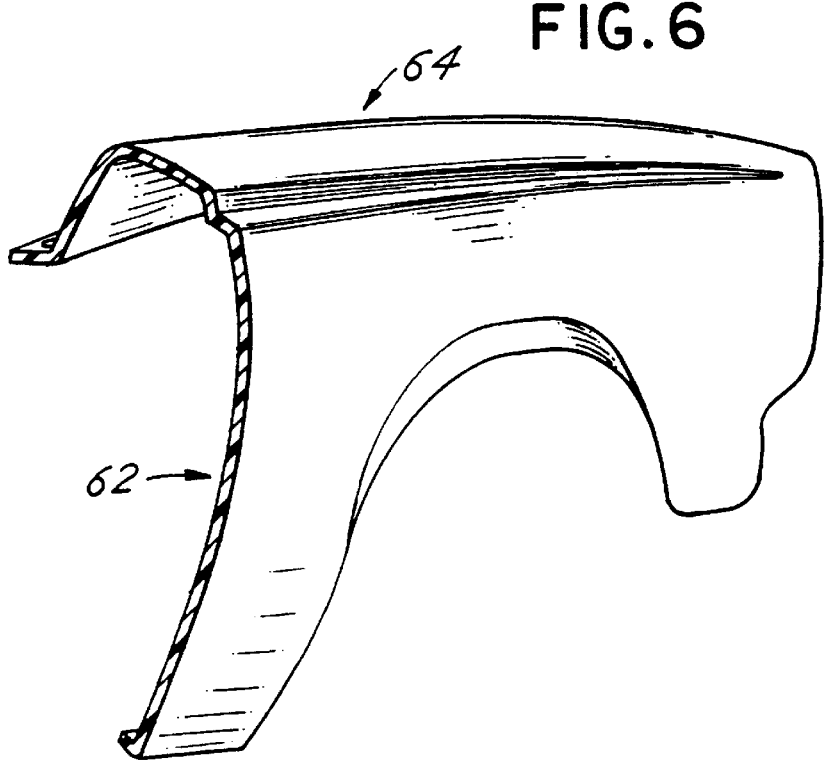
FIG. 6 is a sectional view of a body panel manufactured in accordance with the present invention.

FIGS. 5 and 6 illustrate a bumper beam and a body panel, respectively, manufactured in accordance with the present invention. The bumper beam 52 has been injection molded and includes a predetermined portion 54 that has been additionally blow-molded by retracting predetermined sections of the mold to form predetermined blow cavities and injecting a pressurized gas to force the predetermined portion 54 of the bumper beam 52 to take the shape of the predetermined blow cavities. The body panel 62 has been injection molded and includes a predetermined portion 64 that has been additionally blow-molded by retracting predetermined sections of the mold to form predetermined blow cavities and injecting a pressurized gas to force the predetermined portion 64 of the bumper beam 62 to take the shape of the predetermined blow cavities.

Figure 7:
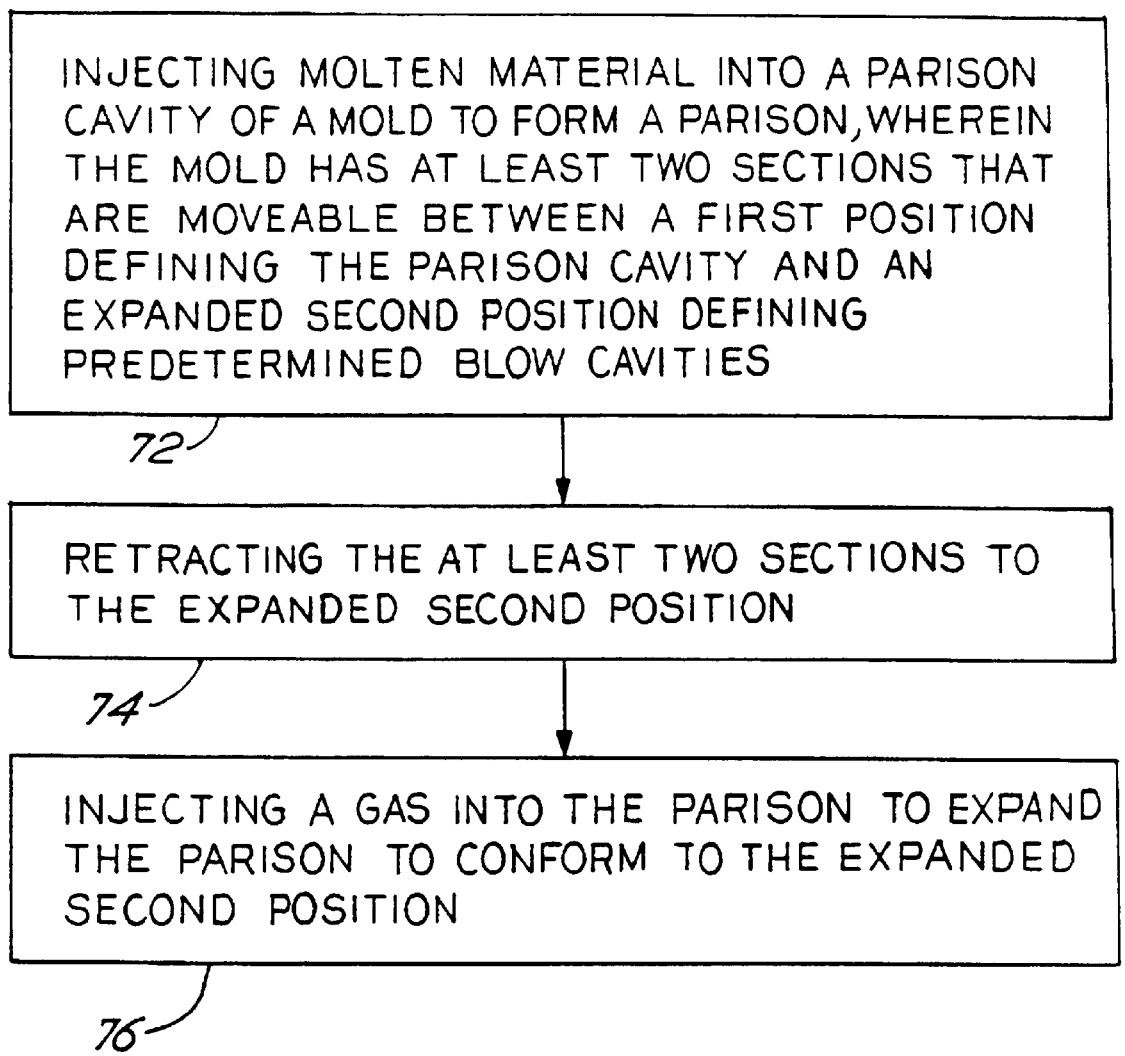
FIG. 7 is a flow chart showing one embodiment of steps in accordance with the method of the present invention.

FIG. 7 is a flow chart showing one embodiment of steps in accordance with the method of the present invention. The steps include: A) injecting 72 molten material into a parison cavity of a mold to form a parison, wherein the mold has at least two sections that are moveable between a first position defining the parison cavity and an expanded second position defining predetermined blow cavities; B) retracting 74 the at least two sections to the expanded second position; and C) injecting 76 a gas into the parison to expand the parison to conform to the expanded second position.

The above-described embodiment of the invention is intended to be an example of the present invention and alterations and modifications may be effected thereto, by those of skill in the art, without departing from the scope of the invention.

What is claimed is:

1. A method for injection blow molding a vehicle component, comprising the steps of:
   injecting molten material into a parison cavity of a mold to form a parison, wherein the mold has a least two mold sections that are moveable between a first position defining the parison cavity and an expanded second position defining predetermined blow cavities that form a vehicle component;
   retracting the at least two mold sections to the expanded second position; and
   injecting a gas into the parison to expand the parison to conform to the expanded second position to form the vehicle component.

2. The method of claim 1 wherein the gas is one of; air and nitrogen.

3. The method of claim 1 wherein the vehicle component is a component of one of:
   an automobile, a truck, a van, and a sport utility vehicle.

4. The method of claim 3 wherein the component is one of: a body panel and a bumper beam.

5. A method for injection blow molding a vehicle component, comprising the steps of:
   injecting molten material into a parison cavity of a mold to form a parison, wherein the mold has a least one mold section that is moveable between a first position defining the parison cavity and an expanded second position defining a predetermined blow cavity that forms a vehicle component;
   retracting the at least one mold section to the expanded second position; and
   injecting a gas into the parison to expand the parison to conform to the expanded second position to form the vehicle component.

6. The method of claim 5 wherein the gas is one of: air and nitrogen.

7. The method of claim 5 wherein the vehicle component is a component of one of: an automobile, a truck, a van and a sport utility vehicle.

8. The method of claim 7 wherein the component is one of: a body panel and a bumper beam.

9. A method for injection blow molding a vehicle component, comprising the steps of:
   injecting molten material into a parison cavity of a mold to form a parison, wherein the mold has a least two mold sections that are moveable between a first position defining the parison cavity and an expanded second position defining predetermined blow cavities, the at least two mold sections having end surfaces that are shaped to be complementary with molding surfaces of the parison cavity;
   retracting the at least two mold sections to the expanded second position; and
   injecting a gas into the parison to expand the parison to conform to the expanded second position.

10. The method of claim 9 wherein the gas is one of: air and nitrogen.

11. The method of claim 9 wherein the vehicle component is a component of one of: an automobile, a truck, a van, and a sport utility vehicle.

12. The method of claim 11 wherein the component is one of: a body panel and a bumper beam.

13. A method for injection blow molding a vehicle component, comprising the steps of:
   injecting molten material into a parison cavity of a mold to form a parison, wherein the mold has at least one mold section that is moveable between a first position defining the parison cavity and an expanded second position defining a predetermined blow cavity, the at least one mold section having an end surface that is shaped to be complementary with a molding surface of the parison cavity;
   retracting the at least one mold section to the expanded second position; and
   injecting a gas into the parison to expand the parison to conform to the expanded second position.

14. The method of claim 13 wherein the gas is one of: air and nitrogen.

15. The method of claim 13 wherein the vehicle component is a component of one of: an automobile, a truck, a van, and a sport utility vehicle.

16. The method of claim 15 wherein the component is one of: a body panel and a bumper beam.

* * * * *